Dec. 12, 1950     L. H. CROOK     2,533,920
ELECTRIC DISTRIBUTION SYSTEM
Filed June 6, 1942
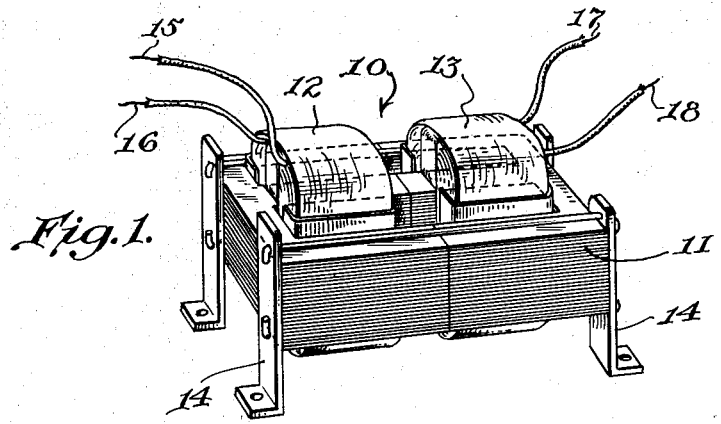
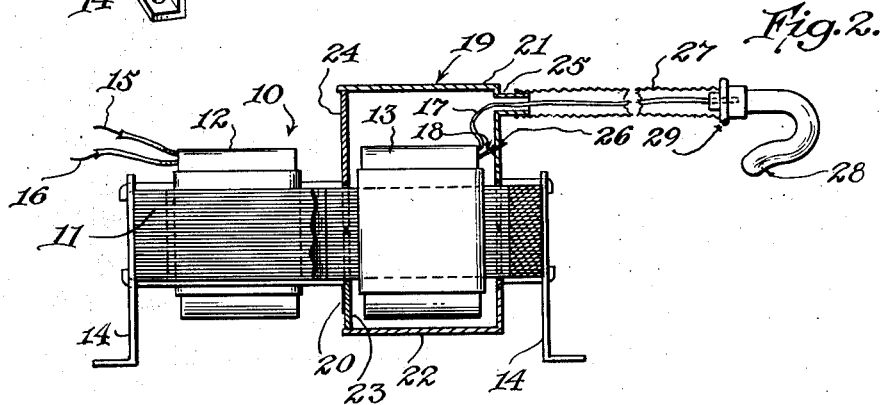
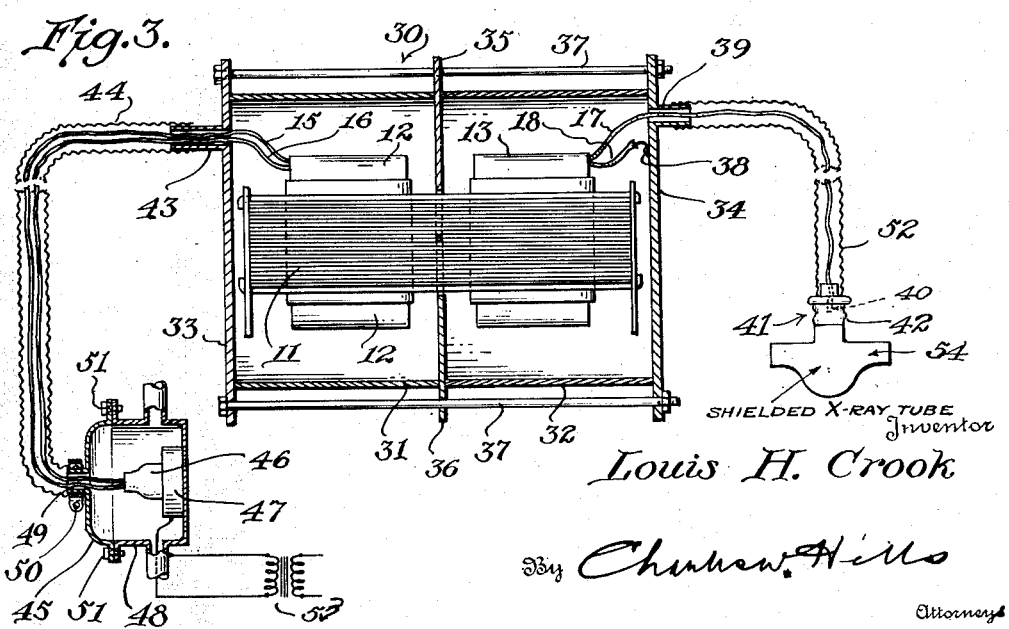
Inventor
Louis H. Crook Patented Dec. 12, 1950

2,533,920

UNITED STATES PATENT OFFICE 2,533,920

ELECTRIC DISTRIBUTION SYSTEM

Louis H. Crook, Washington, D. C., assignor of sixty-five per cent to Samuel B. Pack, Washington, D. C.

Application June 6, 1942, Serial No. 446,149

3 Claims. (Cl. 171—97)

The present invention relates to electric distribution systems including a transformer and the wiring connecting the transformer to the load and source.

It is an object of this invention to provide a self-contained secondary system connected to a transformer and arranged to provide the maximum of safety and utility to the user of the secondary system.

It is a further object of this invention to provide a transformer with its primary winding and its secondary winding housed in casings individual to each winding whereby each winding is isolated from the other, with the exception that only electro-magnetic energy may be transferred from one to the other.

It is a further object of this invention to provide a transformer housed in a casing preferably of non-magnetic material of good current conductivity, and with means forming a barrier interposed between the primary and secondary windings whereby the two windings are isolated from each other, except for the specific means of electro-magnetic energy transfer to and from the windings by means of the iron core.

It is a further object of this invention to provide a transformer housed in a casing preferably of non-magnetic material of good current conductivity and with one of the primary conductors connecting the primary of the transformer with the house supply system shielded in a conduit conductively connecting the casing with the grounded outlet box of the house wiring system.

Other and further objects of the invention will be apparent from the following description and the accompanying drawings.

Figure 1 is a showing of a conventional transformer in perspective.

Figure 2 is a showing of the transformer connected to a secondary wiring system and with the secondary winding shielded.

Figure 3 is a showing of the transformer housed in a casing and connected to primary and secondary wiring systems. Parts are in section, parts in elevation, parts broken, and parts are shown diagrammatically.

In Figure 1 there is shown a conventional transformer 10 usually employed to connect high voltage apparatus to the 110-volt lighting system of a house or office. It has a laminated steel core 11 upon which are placed a 110-volt primary winding 12 and a 5000-volt secondary winding 13. Supporting brackets 14 are secured to the core by suitable means. The transformer is air-cooled. The secondary voltage of a transformer of this type is usually high enough to operate tubes filled with neon, apparatus employing spark gaps, and high voltage equipment used by physicians and hospitals.

The primary winding has a pair of primary leads 15 and 16, and the secondary winding has a pair of secondary leads 17 and 18.

The transformer is shown again in Figures 2 and 3, and similar numerals are applied to similar parts.

In Figure 2 the transformer 10 is shown with its secondary winding inclosed in a metallic chamber forming means to electromagnetically and electrostatically shield the secondary electric circuit from the earth, and, strictly speaking, to make it a non-grounded circuit.

The secondary winding 13 is housed in a box or casing 19 of a material of good conductivity, such as brass or copper. Care is taken to insulate the iron core and coil, as is usual in the ordinary transformer. Care is also taken that the face of the casing is coated with an insulating paint or enamel, indicated at 20, to prevent short-circuiting of the edges of the laminations of the core, or is otherwise insulated from the core where it might do so.

The casing 19 may be formed as a shallow box or cup of two halves 21 and 22, and a closure plate of two parts 23 and 24 fitted about the core and between the primary and secondary windings. The outer end of the box is provided with an aperture opening into an integrally connected nipple 25, and one secondary lead 17 extends through the nipple and within a woven-wire tube 27 to a suitable outlet socket, indicated generally at 29, for connection to a load 28, which may be a gas-filled tube, a shielded X-ray tube, or the like. The lead 17 is suitably connected to one terminal in the socket 29 and insulated from the casing thereof, and the tube 27 is conductively connected to the casing of the socket as the other path of the circuit. The tube 27 is soldered to or otherwise conductively connected to the nipple 25, and thus is bonded to the casing 19. The other secondary lead 18 is conductively connected to the casing as indicated at 26.

The engaging parts of the casing which forms the housing for the secondary are arranged as to fit, or to have sufficient contact resistance, so that stray magnetic flux will not set up an appreciable eddy current in the casing to cause undue heating thereof.

The leads 15 and 16 of the primary winding 12 are connected to the lighting supply system in a conventional manner, and it is customary in conventional lighting systems to connect one of the leads to ground.

It will now be evident that the secondary system is one in which the source 13 is shielded by the shield or casing 19, and that the shielding is extended to embrace the lead 17 and to form a path for the return current through the tube 27 from the socket 29.

The secondary system is, of course, magnetically coupled to the primary by the laminated core, but, apart from this magnetic coupling, the secondary system, which includes the secondary winding and the connected load, is self-contained and isolated from the primary system, and is independent of which of the primary leads is connected to earth.

The secondary system is ungrounded; that is, it is independent of ground, for the shield carries all of the return current from the load, and it may be buried in the earth and still be ungrounded, because the earth is not a part of the circuit. There has, therefore, been shown a secondary system completely shielded and independent of ground, although adapted to derive its energy from a conventional grounded primary power system. Since the secondary system is self-contained and completely shielded, it is obviously one that is perfectly safe to the operator, even when high voltages are employed in the secondary system, as in X-ray work.

In Figure 3 there is shown again a conventional transformer core, and similar numerals are applied to the laminated core 11, the primary winding 12, and the secondary winding 13. To this conventional arrangement there is applied means defining a first chamber to house the primary winding, and a second chamber to house the secondary winding.

A casing indicated generally by the numeral 30 is formed of two tubes 31 and 32, two end plates 33 and 34, and an intermediate plate of two halves 35 and 36, fitted against the core. The parts of the casing are held in assembled relation by bolts 37, or other suitable means, and the parts of the casing are held in spaced relation to the core by wedges (not shown) or by other suitable means.

One of the secondary leads, 18, is soldered or otherwise conductively bonded to the casing as indicated at 38, and the other secondary lead 17 is passed through a metallic nipple 39, conductively connected to the casing, to go to the central terminal 40 of an Edison type socket 41. A shielded X-ray tube, indicated generally at 54, may be connected to the socket. The metallic shell 42 of the socket is conductively connected to a tube or conduit 52 of woven metallic wire, and this tube incloses the lead 17 and is conductively connected to the nipple 39. The tube 52, or its equivalent, should be of good conductivity throughout so that the shell 42 has the same potential as the casing inclosing the secondary.

The tube 52 may be of rigid conduit where flexibility is not desired, and other connecting means at the load may be substituted for the socket. The load device may be an apparatus which has one terminal thereof conductively connected to an inclosing casing, and to the conduit, and the other terminal thereof suitably insulated from the casing and connected to the secondary lead.

The secondary system may contain high-frequency apparatus, or apparatus employing spark-gaps or the like and sources of disturbing surges, but the shielded and self-contained secondary system just described isolates the primary from these high-tension surges and prevents their being carried to equipment connected to the primary system.

It is conventional to ground the frames of motors and one side of a two-wire circuit, or the neutral of a three- or four-wire circuit, in an effort to avoid the possibility of the frame of the motor becoming connected to a wire of the system at a potential above or below ground potential and being maintained at a potential above or below ground potential. When transformers are used in homes, in institutions for the care of the sick, and in the offices of physicians, and often in connection with devices operating at high voltage, it is essential that the installation be of such a nature that it will always be in a safe condition after long use by persons inexperienced in the electrical art. These transformers often must be portable so that the equipment comprising the transformer and the load device may be carried from room to room and to the bedside of patients without necessitating an electrician in attendance. To make certain of proper grounding of the primary and of the casing 30 when the equipment is moved from one location to another in a building, the primary leads pass through an aperture in the plate 33, through a metallic nipple or extension 43 on the plate, and through a conduit 44, of woven metallic wire, which is bonded at one end to the plate 33 and at the other end to a cover plate 45 of a wiring system outlet box. The leads terminate in a plug 46 to be inserted in a socket 47 housed in an outlet box 48 connected to the metallic conduit of the house wiring system. The socket and box are connected to a source of current indicated at 53. The woven wire conduit is provided with a rigid terminal sleeve 49, clamped by a suitable clamp 50 to the metallic box cover. The box is of such a depth that the plug 46 is housed therein when the cover is held in place on the metallic box by the screws 51, or other fastening means.

Care is taken to make certain of a connection of good conductivity between the primary casing and the outlet box, and the plug may be arranged in relation to the box cover so that the cover must be in good contact with the earth-grounded supply box cover if the primary circuit is to be considered as fully protecting the operator from the low voltage of the city supply line.

The arrangement of parts shown in Figure 3 makes it feasible to place the transformer in any position with reference to the load in commercial applications such as neon signs or neon traffic lights, or X-ray equipment and other high-voltage loads with full protection to persons from the high voltages.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

I claim as my invention:

1. A first winding, a casing of nonmagnetic material of good current conductivity disposed housing said first winding, a load device including an outer metallic terminal and also including an inner metallic terminal disposed substantially housed by said outer terminal and insulated therefrom, metallic conduit means conductively connecting said casing and said outer terminal, one pole of said winding being conductively connected to said casing and the other pole of said winding being connected to said inner terminal by an insulated lead disposed within said conduit, a second winding disposed externally of said casing, and means to couple said first winding and said second winding to define a transformer therewith, said means comprising a core of magnetic material entered in said first winding and extending outwardly through a wall of said casing and entered in said second winding.

2. A first winding, a casing of substantially non-magnetic material of good current conductivity disposed housing said first winding, a load device including an outer metallic terminal and also including an inner metallic terminal disposed substantially housed by said outer terminal and insulated therefrom, metallic conduit means conductively connecting said casing with said outer terminal, one pole of said winding being conductively connected to said casing and the other pole of said winding being connected to said inner terminal by a wire within said conduit and insulated therefrom, a second winding disposed externally of said casing, and magnetic core means entered in said first winding and entered in said second winding to magnetically couple said first and said second windings and define a transformer therewith.

3. A first winding, a first casing of substantially non-magnetic material of good current conductivity disposed enveloping said first winding, a second winding, a second casing of substantially non-magnetic material of good current conductivity disposed enveloping said second winding, magnetic core means entered in said first winding and entered in said second winding to magnetically couple said first and said second windings and define a transformer therewith, means to conductively connect said first casing with said second casing, a load device including an outer terminal, metallic conduit means conductively connecting said outer terminal with said casings, an inner terminal substantially housed by said outer terminal and insulated therefrom, one of said windings having one pole thereof conductively connected to said casing and having the other pole thereof connected to said inner terminal by a wire disposed within said conduit and insulated therefrom.

LOUIS H. CROOK.

REFERENCES CITED

The following references are of record in the file of this patent:

UNITED STATES PATENTS

| Number | Name | Date |
|---|---|---|
| 440,224 | De Ferranti | Nov. 11, 1890 |
| 473,932 | Kintner | May 3, 1892 |
| 1,645,643 | Crook | Oct. 18, 1927 |
| 2,114,189 | Kronmiller | Apr. 12, 1938 |
| 2,183,355 | Mauerer | Dec. 12, 1939 |